(12) United States Patent
Benayoun et al.

(10) Patent No.: US 6,219,416 B1
(45) Date of Patent: Apr. 17, 2001

(54) METHOD AND APPARATUS FOR PROCESSING FISU FRAMES ACCORDING TO THE SIGNALLING SYSTEM 7 PROTOCOL

(75) Inventors: Alain Benayoun, Cagnes sur Mer; Jean-Francois Le Pennec, Nice; Patrick Michel, LaGaude; Claude Pin, Nice, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/807,491

(22) Filed: Feb. 27, 1997

(30) Foreign Application Priority Data

Jun. 28, 1996 (EP) .................................. 96480089

(51) Int. Cl.⁷ .................................................. H04M 15/00
(52) U.S. Cl. .......................... 379/219; 379/229; 379/230
(58) Field of Search .................................. 379/219, 229, 379/230

(56) References Cited

U.S. PATENT DOCUMENTS 5,757,895 * 5/1998 Aridas et al. ........................ 379/230

* cited by examiner

*Primary Examiner*—Melvin Marcelo
(74) *Attorney, Agent, or Firm*—A. Sidney Johnston

(57) ABSTRACT

A FISU frame handler which is connected between an adapter and a SS7 low speed network. For each FISU frames transmitted or received in the adapter, an interrupt is generated to a processor located in the adapter. In order to diminish the number of processor interrupts, the FISU frames are externally processed by the FISU frame handler by discarding repeated FISU frames transmitted from the network so as to generate idle state signals to the adapter and by converting idle state signals received from the adapter into repetitive FISU frames to transmit them to the network without interrupting the processor. In order to perform both functions, the FISU frame handler comprises two dedicated hardware units which operate according to specific methods.

10 Claims, 14 Drawing Sheets

MESSAGE SIGNALLING UNIT (MSU) FORMAT:

LINK STATUS SIGNALLING UNIT (LSSU) FORMAT:

FILL-IN SIGNALLING UNIT (FISU) FORMAT:

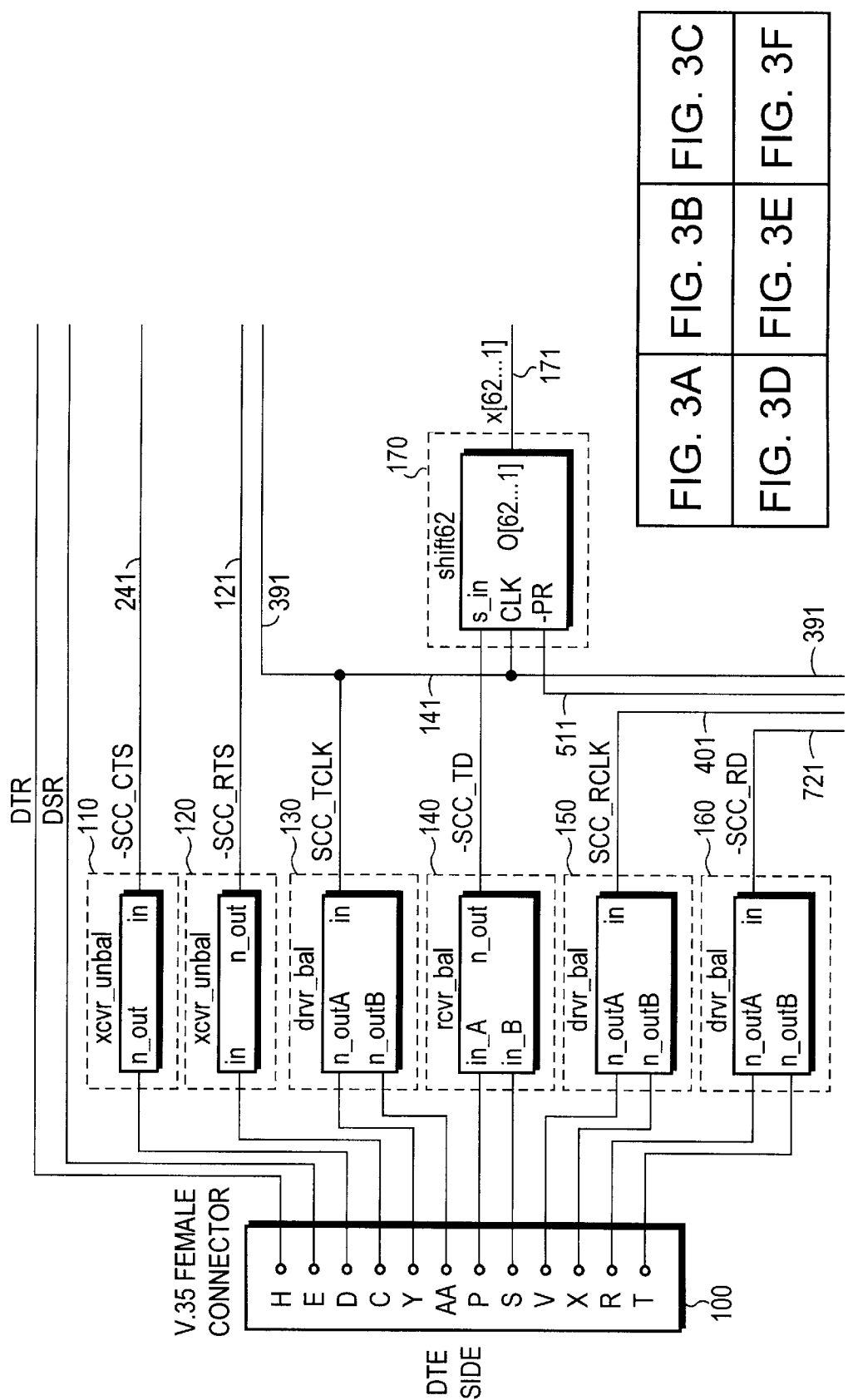

METHOD AND APPARATUS FOR PROCESSING FISU FRAMES ACCORDING TO THE SIGNALLING SYSTEM 7 PROTOCOL

BACKGROUND OF THE INVENTION

1. Field of the Invention

The present invention relates to a method and an apparatus for processing FISU frames carrying no data according to the Signalling System 7 protocol and more particularly to a method and an apparatus for discarding or generating FISU frames without interrupting the processor.

2. Background Discussion

Many telecommunication products are operating according to the Signalling System Number 7 (SS7) protocol. This protocol defines four layers among the seven layers of the OSI (open system interconnect) standard. The four layers are the signalling data link called MTP-1, the signalling link functions called MTP-2, the signalling network functions called MTP-3 and the signalling connection control part called SCCP.

MTP 1 which is a physical layer, defines three types of frames. FIG. 1a shows the format of these SS7 frames also called Signalling Units (SU). MTP 2 uses these three types of SU: the Message Signalling Unit (MSU), the Link Status Signalling Unit (LSSU) and the Fill-In Signalling Unit (FISU).

The MSU, the LSSU and the FISU are respectively 278-byte, 7-byte and 5-byte long between flags. These three types of frames carry two specific data bytes BSN (backward sequence number) and FSN (forward sequence number) in common. The BSN and FSN bytes are respectively dedicated to the received and transmitted data frames and they are sequentially numbered. These numbers are modified according to the data traffic rate, and these bytes remain unchanged when no data are exchanged.

By referring to FIG. 1-a, the other initials stand for:

F: flag
LI: Length Indicator
SF: Status Field
SIO: Service Information Octet
SIF: Signalling Informing Field
CRC: Cyclic Redundancy Check The particularity of this protocol is: firstly, the format of the network link which is shown in FIG. 1b. Two consecutive SS7 frames are separated by one flag and the ending flag of frame (n) is the starting flag of frame (n+1). Secondly, when no data frame has to be exchanged which corresponds to idle state, the network links carry FISU frames.

In case of no traffic, these FISU frames do not carry any information, and this occurs frequently. On the adapter side, an interrupt is raised to a processor each time a FISU is received or transmitted that is to say every 6 byte. This environment is applicable to the low speed SS7 network in which the present invention is implemented. A low speed network is operating at a speed of 56 Kbps in the U.S. and 64 Kbps in Europe. Hence, an interrupt occurs every 857 microseconds or 750 microseconds in both transmit and receive directions. These too many interrupts degrade the performance of the SS7 adapter. Therefore it is necessary to process the FISU frames externally from the adapter by suppressing useless FISU frames received from the network and then these interrupts, and by generating FISU frames when idle states (no data signals) are transmitted from the adapter to the network without interrupting the processor.

SUMMARY OF THE INVENTION

An object of the invention is to provide a method and an apparatus to avoid interruption of a processor located in the adapter when no data frames are transmitted nor received.

The Signalling System 7 (SS7) protocol uses particular types of frames. The apparatus according to the present invention is a FISU frame handler 50 which is connected between an adapter 60 and a SS7 low speed network 70 as shown in FIG. 2. For each FISU frames transmitted or received in the adapter, an interrupt is generated to the processor 65 located in the adapter. Therefore, in order to diminish the number of processor interruptions, the FISU frames are externally processed by the FISU frame handler by discarding repeated FISU frames transmitted from the network 70 so as to generate idle state signals to the adapter 60 and by converting idle state signals received from the adapter 60 into repetitive FISU frames to transmit them to the network 70 without interrupting the processor. In order to perform both functions, the FISU frame handler comprises two dedicated hardware units which operate according to specific methods.

The FISU apparatus comprises first means for receiving FISU frames from the adapter and repeating FISU frames to transmit them to the network without interrupting the processor and second means for receiving FISU frames from the network and discarding repeated FISU frames without interrupting the processor of the system.

More specifically, the FISU apparatus comprises means for generating flags; repeated FISU frames and data frames received from the adapter to the network; multiplexing means for transmitting flags; repeated FISU frames or data frames received from the adapter to the network; and a logic circuit for controlling the generating means and the multiplexing means. Conversely the apparatus also comprises another generating means for discarding repeated FISU frames and data frames received from the network to the adapter; associated multiplexing means for transmitting idle pattern or data frames received from the network, and a logic circuit for controlling the generating and multiplexing means.

The method of processing the FISU frames comprises the following steps:

(a) Receiving, in transmission mode, a FISU frame from the adapter and repeating FISU frames when no data are received from the adapter to transmit them to the network without interrupting the processor; and (b) Receiving, in reception mode, FISU frames from the network and discarding repeated FISU frames by transmitting idle state signals to the adapter without interrupting the processor.

BRIEF DESCRIPTION OF THE DRAWINGS

FIG. 1-b is a representation of a network link format applicable in both transmit and receive directions for a low speed SS7 network.

DETAILED DESCRIPTION OF THE INVENTION

Figure 2:
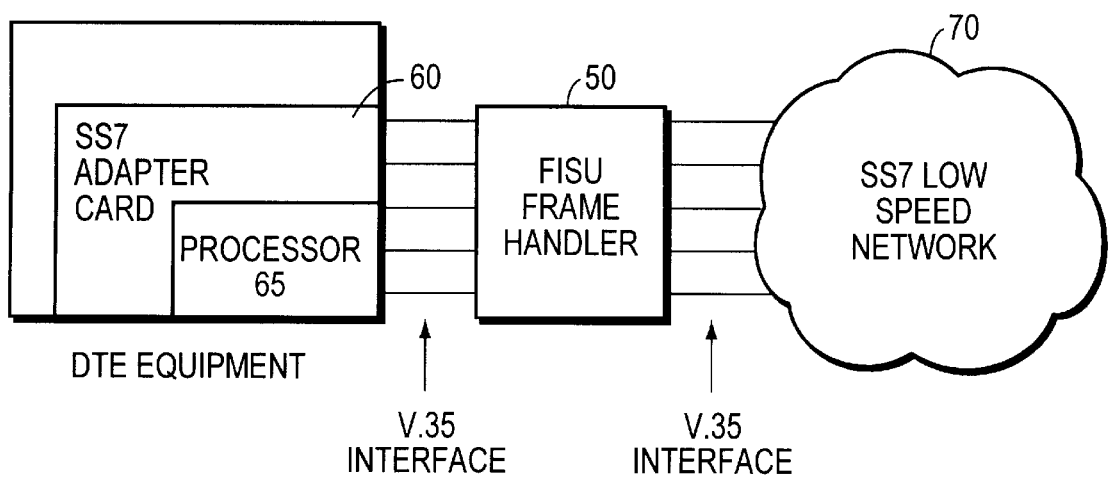
FIG. 2 is a block diagram of an FISU handler coupled between Data Terminal Equipment (DTE) and a low speed SS7 network according to the principles of the present invention.

In FIG. 2, an 'FISU frame handler' 50 according to the present invention, is connected between an SS7 adapter 60 and a network 70, requiring a V.35 electrical interface. The 'FISU frame handler' performs the following functions. In transmission, the 'FISU frame handler' detects and stores each FISU initiated by the adapter and repeats this FISU in idle state without interrupting the adapter's processor 65. In reception, the 'FISU frame handler' detects and discards the FISU frames that do not carry any information and generates idle state signals to the adapter. In both cases, FISU interrupts are not generated to the processor 65.

HARDWARE DESCRIPTION OF THE INVENTION

The hardware architecture using this invention is illustrated in the set of FIGS. 3A–3F. It is composed of two independent hardware parts: a transmission part and a reception part.

Figure 3B:
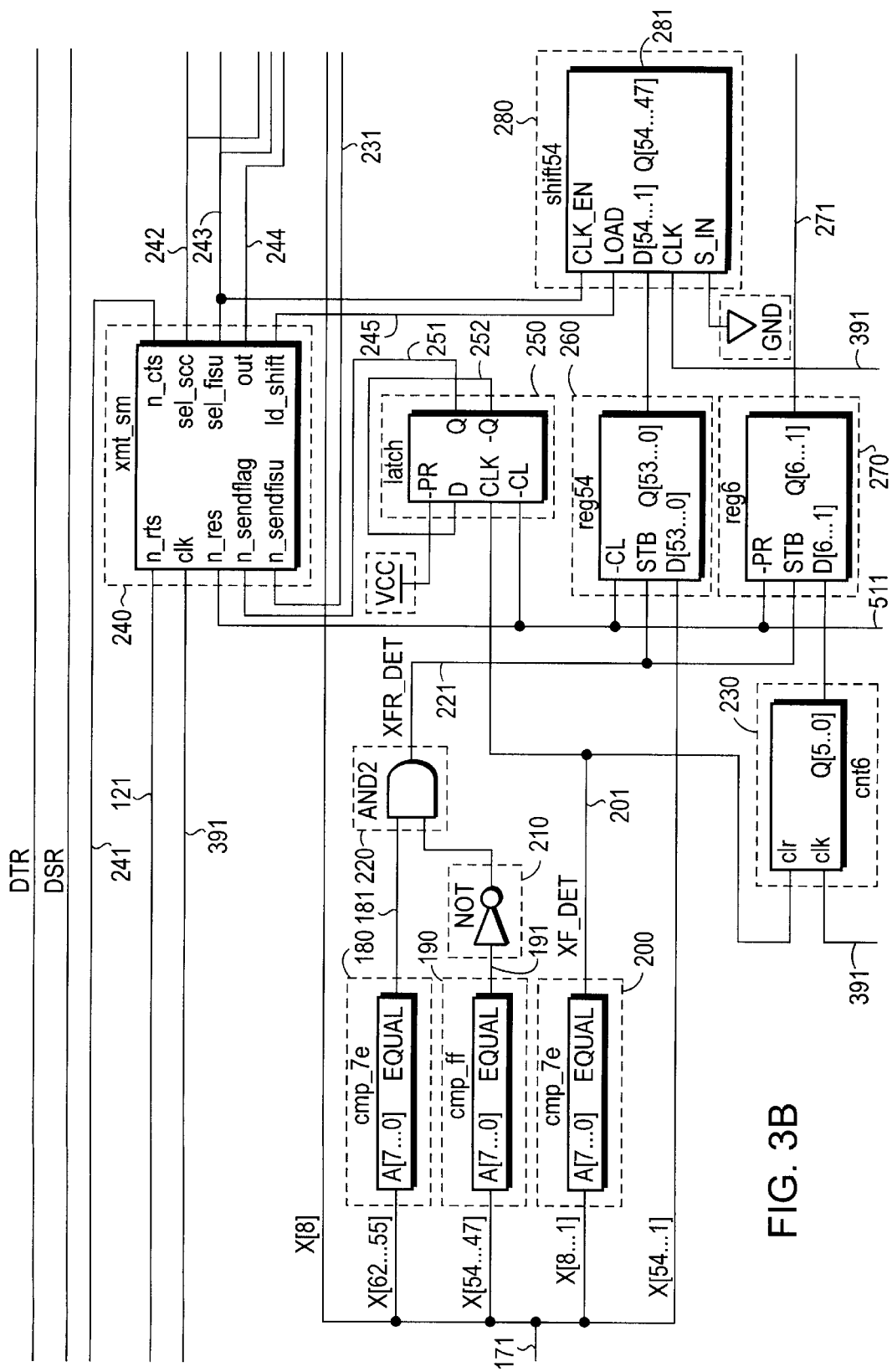
FIG. 3 is an assembly diagram of FIGS. 3A to 3F which are a representation of the FISU Handler of FIG. 2 which incorporates the principles of the present invention.
Figure 3C:
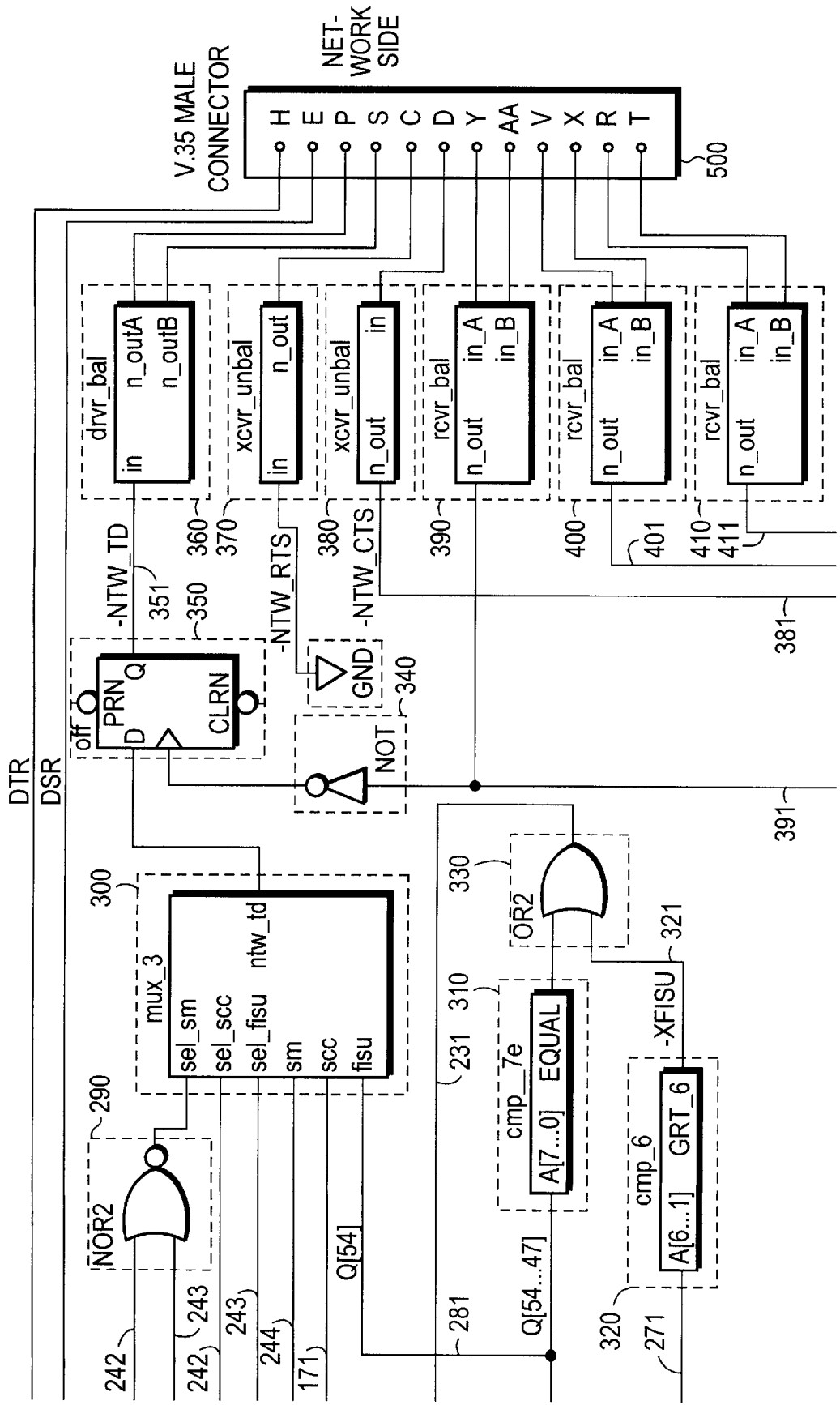

In FIG. 3A, a connector 100 of the female type V.35 has a pin H which is connected to a pin H of a connector 500 shown in FIG. 3C of the male type V.35 by a lead referred as DTR. In the same way, pin E of connector 100 is connected to pin E of connector 500 by a lead referred as DSR. Pins D and C of connector 100 are respectively connected to an output N_OUT of a V.35 unbalanced transceiver 110 and to an input IN of a V.35 unbalanced transceiver 120. Pins Y and AA of connector 100 are respectively connected to outputs N_OUTA and N_OUTB of a V.35 balanced driver 130. Pins P and S of connector 100 are respectively connected to inputs IN_A and IN_B of a V.35 balanced receiver 140. Pins V and X of connector 100 are respectively connected to outputs N_OUTA and N_OUTB of a V.35 balanced driver 150. Pins R and T of connector 100 are respectively connected to outputs N_OUTA and N_OUTB of a V.35 balanced driver 160.

In the same way, pins D and C of connector 500 shown in FIG. 3C are connected to an input IN of a V.35 unbalanced transceiver 380 and an output N_OUT of a V.35 unbalanced transceiver 370. Pins Y and AA of connector 500 are respectively connected to inputs IN_A and IN_B of a V.35 balanced receiver 390. Pins P and S of connector 500 are respectively connected to outputs N_OUTA and N_OUTB of a V.35 balanced driver 360. Pins V and X of connector 500 are respectively connected to inputs IN_A and IN_B of a V.35 balanced receiver 400. Pins R and T of connector 500 are respectively connected to inputs IN_A and IN_B of a V.35 balanced receiver 410.

In FIG. 3B, an output N_CTS of a transmit state machine 240 is connected to an input IN of the V.35 unbalanced transceiver 110 by a lead 241 referred as -SCC_CTS. In the same way, an output N_OUT of a V.35 unbalanced transceiver 120 is connected to the input N_RTS of transmit state machine 240 by a lead 121 referred as -SCC_RTS.

In FIG. 3C, an output N_OUT of a V.35 balanced receiver 390 is connected by a lead 391 to an input of an inverter 340, to a clock input CLK of a 54-bit shift register 280 shown in FIG. 3B, to a clock input CLK of a 6-bit counter 230, to a clock input CLK of transmit state machine 240, and to a clock input CLK of a 62-bit shift register 170, and to an input IN of V.35 balanced driver 130, shown in FIG. 3A. The lead 391 is further referred as SCC_TCLK.

In FIG. 3A, an output N_OUT of V.35 balanced receiver 140 is connected to the serial input S_IN, of 62-bit shift register 170 by a lead 141 referred as -SCC_TD. Conversely, the input IN of V.35 unbalanced transceiver 370 is connected to ground by a lead referred as -NTW_RTS, shown in FIG. 3C.

The output N_OUT of V.35 unbalanced transceiver 380 is connected to an input of an inverter 510, shown in FIG. 3C, by a lead referred to as -NTW_CTS. The output of inverter 510 is connected to a preset input -PR of a 62-bit shift register 520, to a preset input N_PR of a 19-bit register 560, to a preset input -PR of a 6-bit register 270, shown in FIG. 3B, to a clear input -CL of a 54-bit register 260, to the clear input -CL of a latch 250, to the reset input N_RES of transmit state machine 240, to one input of a 3-input AND gate 650, shown in FIG. 3E, to a reset input N_RES of a receive state machine 690 shown in FIG. 3D, and to a preset input -PR of 62-bit shift register 170 shown in FIG. 3A.

Figure 3D:
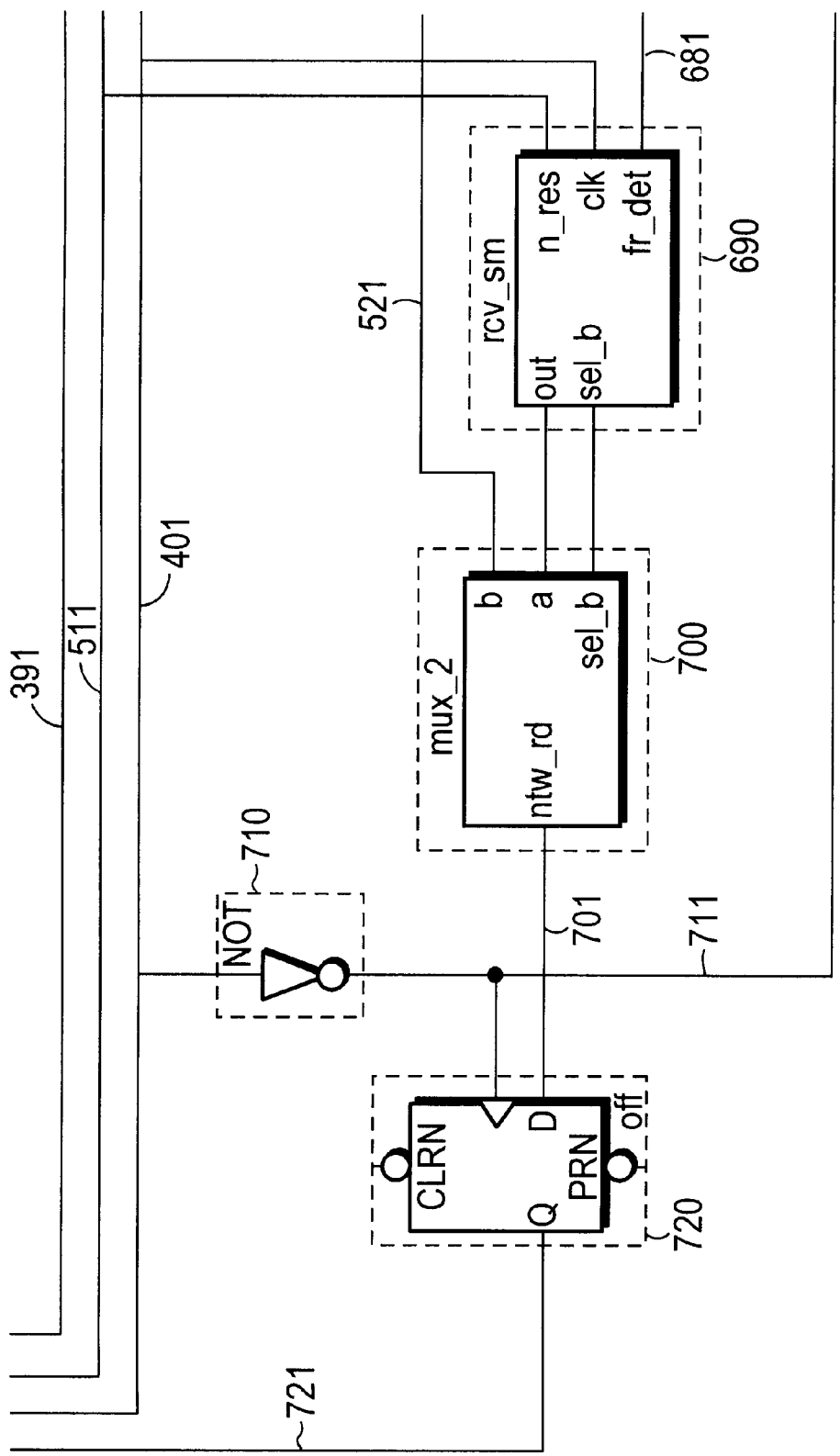

As shown in FIG. 3C and 3D, an output pin N_OUT of V.35_balanced_receiver 400 is connected by a lead 401 to a clock input CLK of 62-bit shift register 520, to a clock input CLK of a 6-bit counter 570, to a clock input CLK, of receive state machine 690, to an input of an inverter 710 and to an input IN of V.35 balanced driver 150 (see FIG. 3A). The lead 401 is further referred as SCC_RCLK.

An output pin N_OUT of V.35 balanced receiver 410 is connected to a serial input S_IN of 62-bit shift register 520 by a lead 411 referred as -NTW_RD.

Figure 3E:
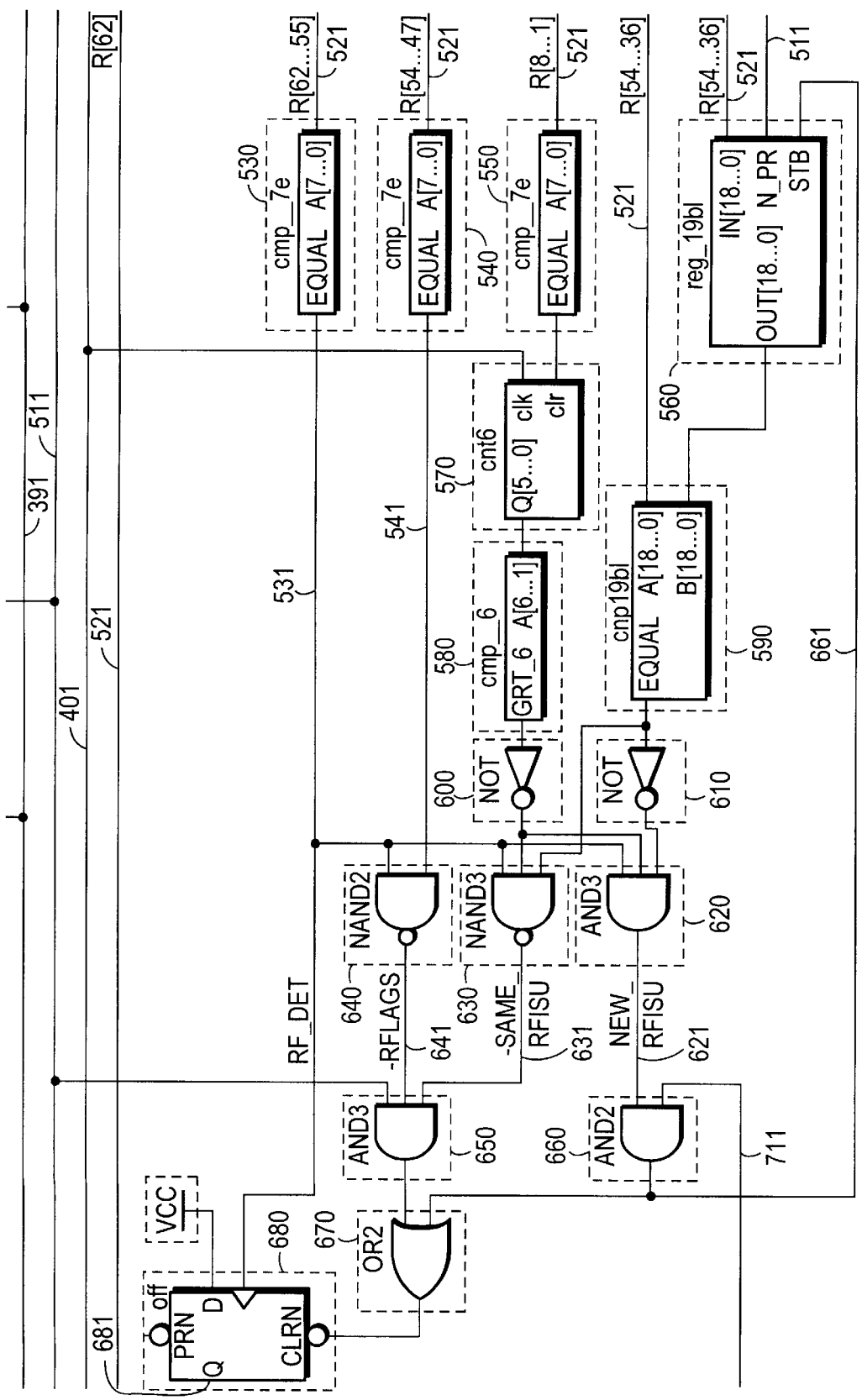

Referring to FIGS. 3C, 3D and 3E, an output of inverter 340 is connected to a clock input of a latch 350 whose output Q is connected by lead 351 to an input IN of V.35 balanced driver 360. The lead 351 is further referred as -NTW_TD. Conversely, an output pin of inverter 710 is connected to a clock input of a latch 720 and to one input of a 2-input AND gate 660. An output pin Q of latch 720 is connected to an input IN of V.35 balanced driver 160 in FIG. 3A by a lead 721 referred as -SCC_RD.

In FIG. 3A and 3B, pins Q(54 . . . 1) of 62-bit shift register 170 are connected to inputs D(53 . . . 0) of 54-bit register 260 by an output bus X(54 . . . 1). Pins Q(8 . . . 1) of 62-bit shift register 170 are connected to inputs A(7 . . . 0) of a 7E comparator 200 by an output bus X(8 . . . 1). Pins Q(54 . . . 47) of 62-bit shift register 170 are connected to inputs A(7 . . . 0) of a FF_comparator 190 by an output bus X(54 . . . 47). Pins Q(62 . . . 55) of 62-bit shift register 170 are connected to inputs A(7 . . . 0) of a 7E comparator 180 by an output bus X(62 . . . 55). An output Q(8) of 62-bit shift register 170 is connected by a lead X(8) to an input SCC of a 3-input multiplexer 300 (see FIG. 3C).

An output EQUAL of 7E_comparator 180 is connected to an input of a 2-input AND gate 220 whose second input is connected to an output of an inverter 210. An output of 2-input AND gate 220 is connected by lead 221 to an input STB of 54-bit register 260 and to a strobe input STB of 6-bit register 270. The lead 221 is further referred as XFR_DET.

In the same way, an output EQUAL of FF comparator 190 is connected to the input of inverter 210. An output EQUAL of 7E comparator 200 is connected by lead 201 to an clear input CLR of 6-bit counter 230 and to a clock input CLK of latch 250. A preset input -PR of latch 250 is connected to Vcc. An output -Q of latch 250 is connected to an input D of latch 250. An output Q of latch 250 is connected by a lead carrying a signal send_flag to a pin N_SENDFLAG of transmit state machine 240.

In FIGS. 3B and 3D, pins Q(5 . . . 0) of 6-bit counter 230 are connected to inputs D(6 . . . 1) of 6-bit register 270 by an output bus. Pins Q(6 . . . 1) of 6-bit register 270 are connected to inputs A(6 . . . 1) of a 6_comparator 320 by an output bus. Pin GRT_6 of 6_comparator 320 are connected to an input of a 2-input OR gate 330 by an output lead 321 referred as -XFISU.

Pins Q(53 . . . 0) of 54-bit register 260 is connected to inputs D(54 . . . 1) of 54-bit shift register 280 by an output bus. Pins Q(54 . . . 47) of 54-bit shift register 280 are connected by an output bus Q(54 . . . 47) to inputs A(7 . . . 0) of a 7E_comparator 310. An output Q(54) of 54-bit shift register 280 is connected to an input FISU of 3-input multiplexer 300.

Output pin EQUAL of 7E_comparator 310 is connected to a second input of 2-input OR gate 330 whose output is connected to a pin N_SENDFISU of transmit state machine 240 by a send_fisu lead.

Pin LD_SHIFT of transmit state machine 240 is connected to a LOAD input of 54-bit shift register 280 by an output load_shift lead. A data output OUT of transmit state machine 240 is connected to a data input SM of 3-input_ multiplexer 300. An input S_IN of 54-bit shift register 280 is connected to the ground.

Pin SEL_FISU of transmit state machine 240 is connected by a select output lead to a clock_enable input CLK_EN of 54-bit shift register 280, to a select input SEL_FISU, of 3-input multiplexer 300 and to a first input of 2-input NOR gate 290. Pin SEL_SCC of transmit state machine 240 is connected by a select output to a select input SEL_SCC of the 3-input multiplexer 300 and to a second input of 2-input NOR gate 290.

An output of 2-input NOR gate 290 is connected to a select input SEL_SM of 3-input multiplexer 300. A data output -NTW_TD of 3_input_multiplexer 300 is connected to an input D of latch 350.

In FIG. 3E and 3D, pins Q(54 . . . 36) of 62-bit shift register 520 are connected by an output bus R(54 . . . 36) to inputs IN(18 . . . 0) of 19-bit register 560 and to inputs A(18 . . . 0) of a 19-bit comparator 590. Pins OUT(18 . . . 0) of 19-bit register 560 are connected to inputs B(18 . . . 0) of 19-bit comparator 590 by an output bus. Pins Q(8 . . . 1) of 62-bit shift register 520 are connected to inputs A(7 . . . 0) of a 7E_comparator 550 by an output bus R(8 . . . 1). Pin Q(54 . . . 47) of 62-bit shift register 520 is connected to inputs A(7 . . . 0) of a 7E_comparator 540 by an output bus R(54 . . . 47). Pin Q(62 . . . 55) of 62-bit shift register 520 is connected to inputs A(7 . . . 0) of a 7E_comparator 530 by an output bus R(62 . . . 55). Pin Q(62), of 62-bit shift register 520 is connected to an input B of a 2-input multiplexer 700 (see FIG. 3D) by an output lead R(62).

In FIG. 3E, output EQUAL of 7E_comparator 550 is connected to a clear input CLR of 6-bit counter 570 whose output Q(5 . . . 0) is connected to input A(6 . . . 1) of a 6-comparator 580. Output GRT_6 of 6-comparator 580 is connected to an input of an inverter 600 whose output is connected to an input of a 3-input NAND gate 630 and to an input of a 3-input AND gate 620.

Output EQUAL of 7E_comparator 540 is connected to an input of a 2-input NAND gate 640. Conversely, output EQUAL of 7E_comparator 530 is connected by a lead 531 to a second input of 2-input NAND gate 640, to a second input of 3-input NAND gate 630, to a second input of 3-input AND gate 620 and to a clock input of a latch 680. Lead 531 is further referred as RF_DET. An output EQUAL of 19-bit comparator 590 is connected to a third input of 3-input NAND gate 630 and to an input of an inverter 610 whose output is connected to a third input of 3-input AND gate 620.

The 2-input_NAND gate 640 and the 3-input NAND gate 630 are respectively connected to second and third inputs of 3-input AND gate 650 by leads 641 and 631. These leads are further referred as -RFLAGS and -SAME_RFISU. Conversely, an output of 3-input AND gate 620 is connected to a second input of 2-input AND gate 660 and to an input of a 2-input OR gate 670 by a lead 621 referred as NEW_RFISU. An output of 2-input AND gate 660 is connected to an input STB of 19 bit register 560. An output of 3-input AND gate 650 is connected to a second input of 2-input OR gate 670 whose output is connected to a clear input CLRN of latch 680.

In FIGS. 3D and 3E, input D of latch 680 is connected to Vcc and its output Q is connected to an input FR_DET of receive state machine 690. This latter has a data output OUT which is connected to an input A of 2-input multiplexer 700 whereas its output SEL_B is connected to an input SEL_B of the multiplexer 700 whose output NTW_RD is connected to an input D of latch 720.

Functional Hardware Description of the Invention

* FISU Frame Transmission Description:

In FIG. 3C, at power-on, the request_to_send -NTW_RTS signal is activated (it is connected to ground by hardware), then the network receives the active request_to_send signal through V.35 unbalanced transceiver 370. As long as the network is not ready to operate, its clear_to_send signal -NTW_CTS is not activated and the card is in reset mode through inverter 510, shown in FIG. 3F.

In FIG. 3A, the network provides to the card the transmit_clock signal SCC_TCLK 131 through V.35 balanced receiver 390 in order to transmit it to the SS7 adapter through V.35 balanced driver 130.

Figure 4:
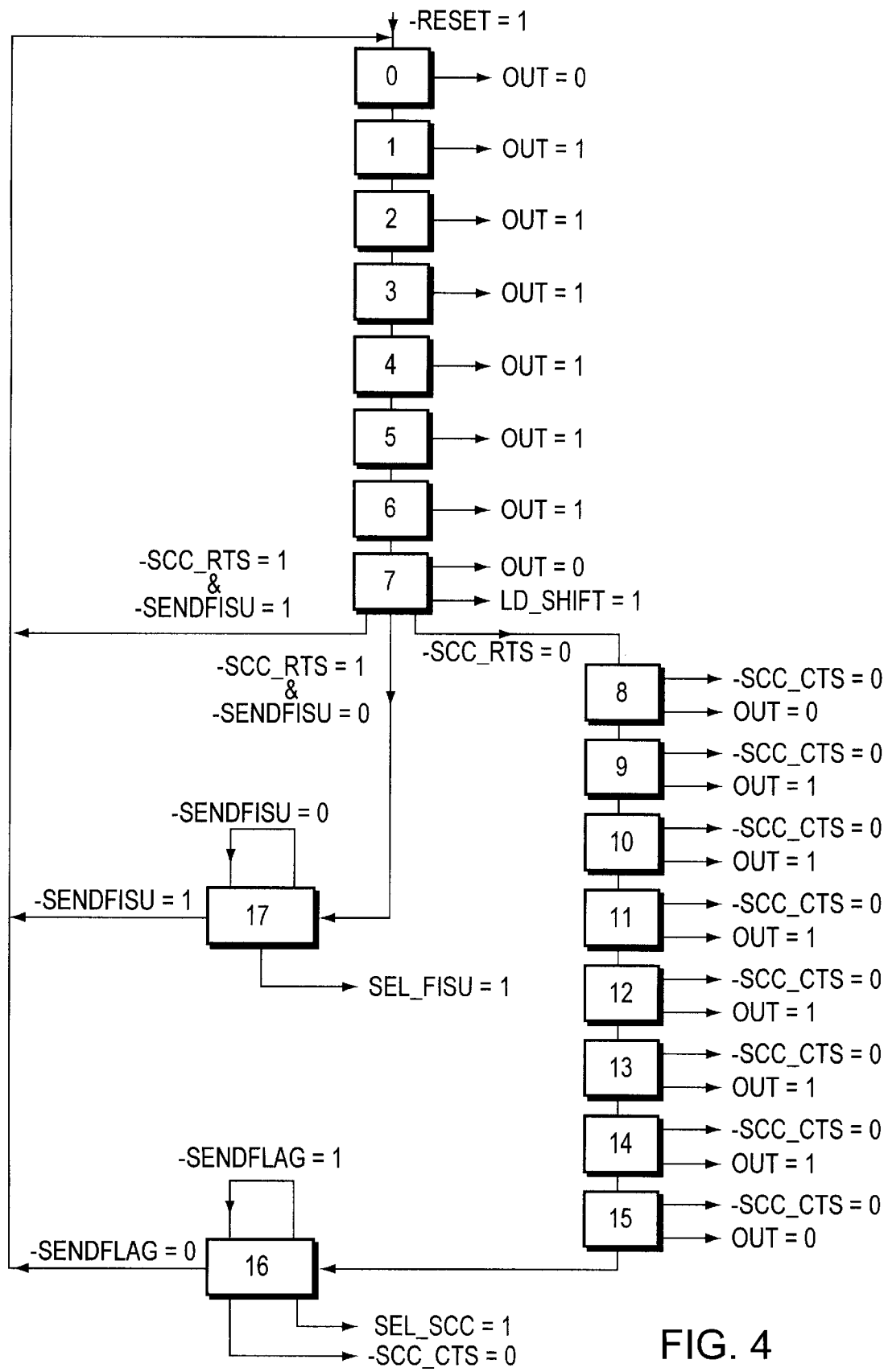
FIG. 4 is a representation of the different states of a transmit state machine in a low speed SS7 signalling network.

When the network is ready to operate, it activates its clear_to_send signal -NTW_CTS through V.35 unbalanced transceiver 380 and the card switches from the reset mode to the operational mode. Then the Transmit_state_machine 240, shown in FIG. 3B, starts to operate as will be described in conjunction with FIG. 4.

State 0 starts when both the input request_to_send signal -SCC_RTS 121, shown in FIG. 3A, and the input send_fisu signal N_SENDFISU (also referred as -SENDFISU) are disactivated. States 0 to 7 generate a flag on the data output OUT and State 7 generates an additional pulse on its pin LD_SHIFT 245, shown in FIG. 3B.

State 8 starts when the input request_to_send signal -SCC_ORTS 121, shown in FIG. 3A, is activated. States 8 to 15 generate a flag on the data output OUT 244, shown in FIG. 3B, and activate the output signal clear_to_send -SCC_CTS 241 on pin N_CTS. Afterwards, the state machine goes to State 16 and the frame received from the SS7 adapter is transmitted to the network, and it is kept at this state until the end of the transmission. This is achievable because the output select signal SEL_SCC 242 and the output clear_to_send signal -SCC_CTS 241 are respectively activated.

Continuing in FIG. 3B, when the input request_to_send signal -SCC_RTS 121 is disactivated and the input send_ fisu signal N_SENDFISU is activated, State 17 starts. The state machine remains at this State 17 during the repeated transmission of FISU frames to the network. This is achievable because the output select signal SEL_FISU 243 is activated.

When the card switches from the reset mode to the operational mode, transmit_state_machine 240 remains on states 0 to 7 where consecutive flags are generated on the data output OUT 244. The select output SEL_SCC 242 and SEL_FISU 243, being disactivated, the select input SEL_SM 291 of 3-input multiplexer 300 shown in FIG. 3C is activated through NOR gate 290. Therefore the network_data output NTW_TD 251, of 3-input multiplexer 300 is internally connected to the data output OUT of transmit state machine 240.

The consecutive flags are generated by transmit state machine 240 on the rising edge of transmit_clock SCC_TCLK. Before getting out onto the network through V.35 balanced driver 360, shown in FIG. 3C, the flags are shifted on the falling edge of transmit_clock by latch 350 which receives the inverted transmit_clock through inverter 340, which is required by the SS7 protocol.

It should be noted that initially, the transmitter function of the SS7 adapter has to be programmed in 'idle off' mode which means that no flags is to be transmitted between frames, by opposition to 'idle on' mode which means that continuous flags are transmitted between frames. When the SS7 adapter has to transmit a frame, it activates its request_to_send signal -SCC_RTS 121, shown in FIG. 3A through V.35 unbalanced transceiver 120. Then the Transmit State Machine 240, shown in FIG. 3B, switches from state 7 to state 8. During states 8–15 the output clear_to_send signal SCC_CTS 241 is activated and a flag is generated. At state 16, the output select signal SEL_SCC 242 is activated to allow the frame coming from the SS7 adapter to be transmitted to the network as described here after.

When the SS7 adapter detects the activation of the clear_to_send signal 241 through V.35 unbalanced transceiver 110 shown in FIG. 3B, it starts transmitting a frame through V.35 balanced receiver 140. This frame is progressing on each clock rising edge into the 62-bit shift register 170 from bit 1 to bit 62 for analysis.

Figure 1A:
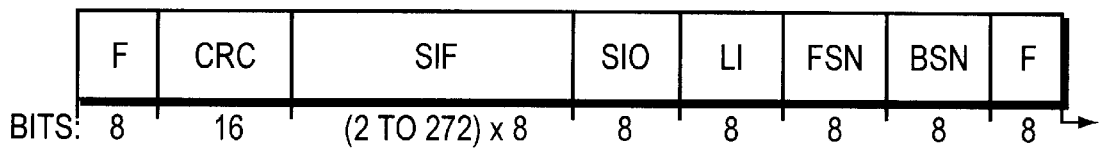
FIG. 1-a is a representation of the format of the three frames MSU, LSSU and FISU in the SS7 signalling protocol.
Figure 1A:
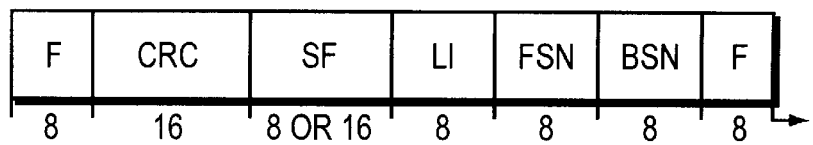
Figure 1A:
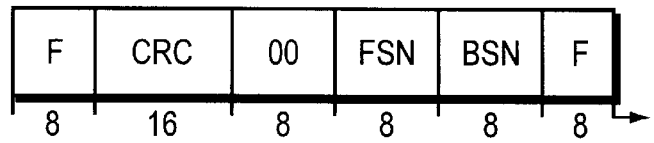
Figure 1B:
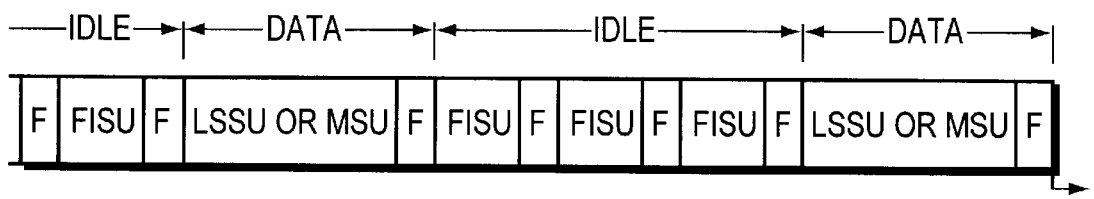

As shown in FIG. 1a, a FISU frame is 7-byte long that is 56-bits long. The shift register is 62-bit long because the frame is a HDLC coded frame which uses the 0-insertion bit algorithm. If a FISU frame is made of FSN, BSN and CRC bytes all equal to FFH, 6 extra bits are automatically inserted by the HDLC protocol. Therefore, a FISU frame varies between 56 and 62 bits.

Figure 5A:
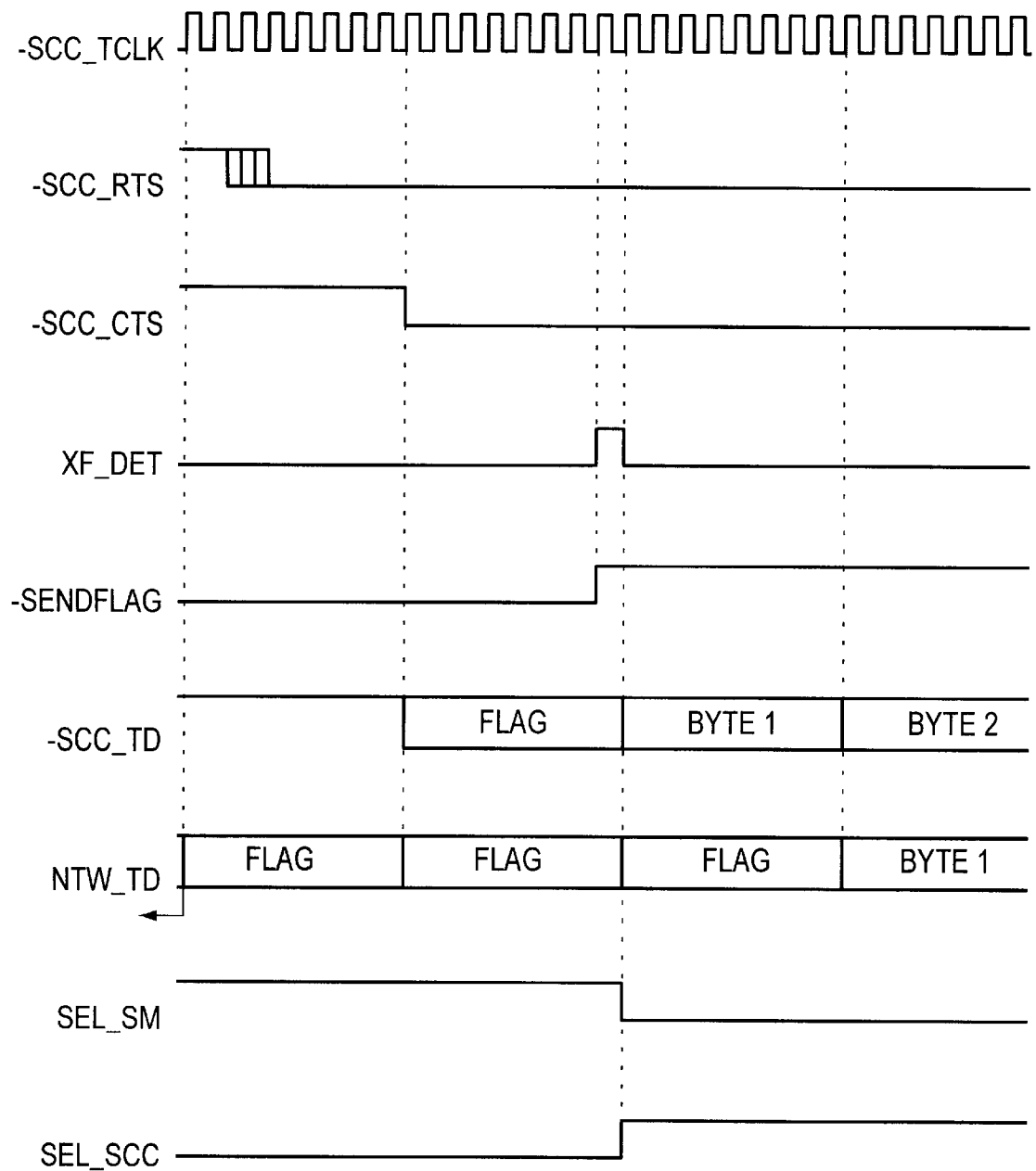
FIGS. 5A and 5B are a timing diagram of the transmission of a SS7 frame from an adapter to the network in FIG. 2.
Figure 5B:
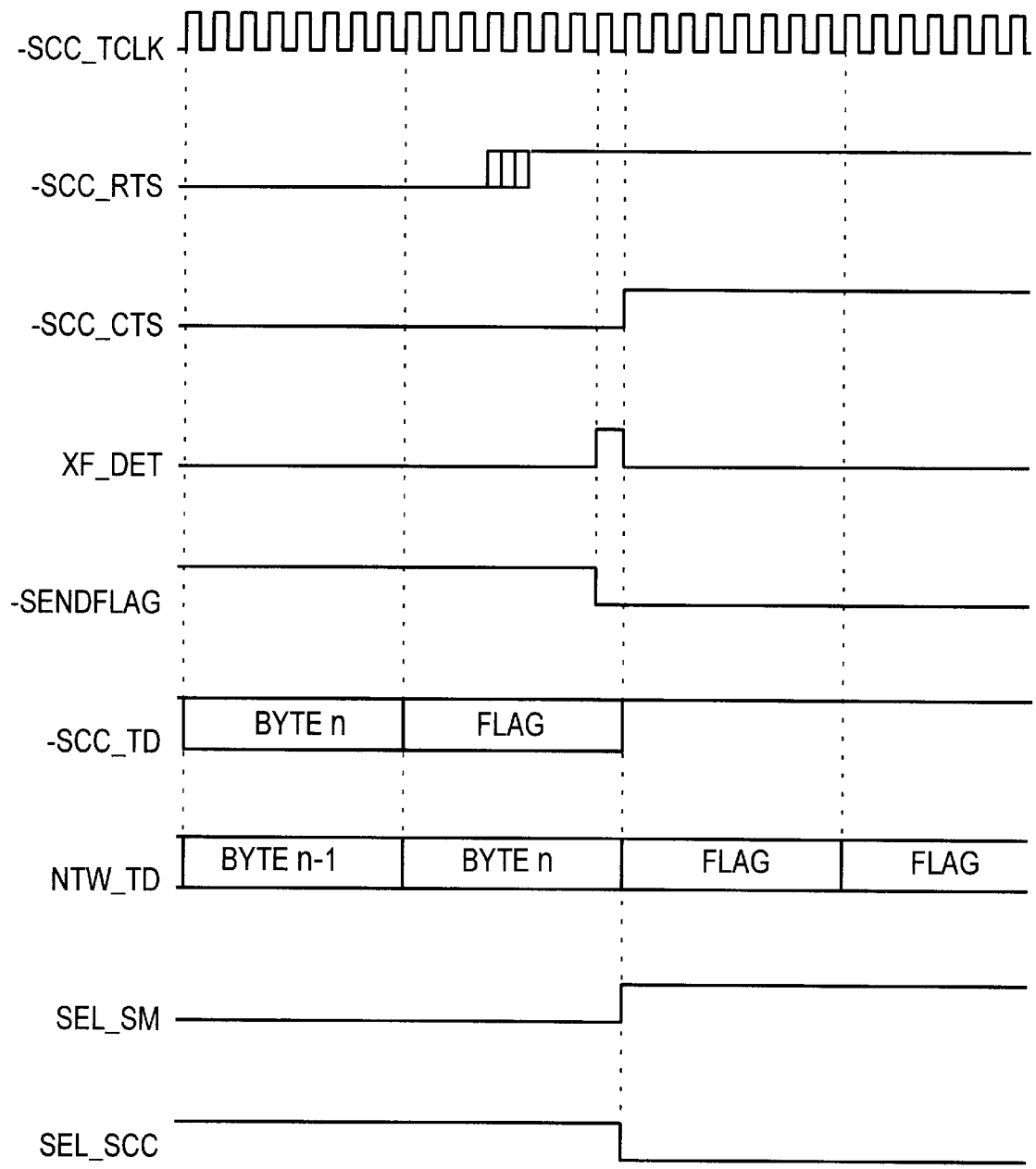

Along with the 62-bit shift register 170, three detection fields are implemented. The contents of bits 1–8, 47–54 and 55–62 are respectively analyzed by comparator 200, shown in FIG. 3E, which checks a flag pattern (7EH value), by comparator 190 which checks an idle pattern (FFH value) and by comparator 180 which checks a flag pattern (7EH value). This analysis performs the 5 following steps and will be described in conjunction with FIGS. 5A, and 5B:

Step 1: The starting_flag of the frame is detected by comparator 200. The output signal XF_DET 201 of comparator 200, shown in FIG. 3B, is activated during one clock period. This pulse clears the content of counter 230 and toggles latch 250 from 0 (reset state) to 1. Thus, the input send_flag signal 251 on pin N_SENDFLAG of transmit state machine 240 is disactivated. In the same time, the output select signal 242 on pin SEL_SCC, being activated by transmit_state_machine 240 modifies the internal connection of 3 input multiplexer 300 shown in FIG. 3: the network_data lead NTW_TD which was connected to the data output OUT of transmit state machine 240 is switched to the data output signal X(8) on pin Q(8) of 62-bit shift register 170 shown in FIG. 3A. Thus, the SS7 adapter frame is transmitted onto the network delayed by a byte while progressing into 62-bit shift register 170.

Step 2: The starting_flag of the frame is detected by comparator 180, shown in FIG. 3B. The output signal 181 of comparator 180 is activated during one clock period. The byte following the starting_flag being the BSN data byte, comparator 190 does not detect the idle pattern (FFH). Therefore, the output 191 of comparator 190 remains disactivated, while AND gate 220 is enabled through inverter 210 which generates a one-clock pulse 221 on the strobe inputs of both 54-bit and 6-bit registers 260, 270. The 54-bit register 260 stores the 6 current HDLC bytes plus an additional 0-bit inserted if any starting from BSN (the starting_flag is not stored in this register). The 6-bit register 270 stores the contents of counter 230. The frame analysis takes place at this time by counting the number of bits to determine the type of frame transmitted by the SS7 adapter.

When comparator 200 detects the starting_flag of a frame, the contents of counter 230 is cleared and it is incremented along with the progression of the starting_flag in 62-bit shift register 170, shown in FIG. 3A. When the starting_flag is detected by comparator 180, the type of frame is determined according to the value of counter 230:

If a MSU frame is transmitted, the counter is greater than 6 and no action is taken (the frame is transmitted to the network);

If a LSSU frame is transmitted, the counter is greater than 6 and no action is taken (the frame is transmitted to the network); and If a FISU frame is transmitted, the counter is lower or equal to 6, the entire frame is stored into 62-bit shift register 170 and the ending_lag is detected by comparator 200 which clears the counter.

Depending on the number of inserted 0-bit, the value of the counter varies between 0 and 6. The value of the counter 170 is stored in the register 270 at the end of the frame analysis. If the output bus of 6-bit register 270, shown in FIG. 3B, is lower than 7, signal -XFISU on lead 321 is activated by comparator 320, shown in FIG. 3C. This signal is transmitted to the input N_SENDFISU of transmit state machine 240 through OR gate 330. The repeated transmission of FISU frames has to take place. A detailed description is given below in step 5.

Step 3: The ending_flag of the frame is detected by comparator 200. This phase is described in the timing diagrams of FIG. 5B, as follows.

The output signal XF_DET on lead 201 of comparator 200 is activated during one clock period. This signal clears the content of counter 230 and toggles latch 250 from 1 to 0. Thus, the input N_SENDFLAG, of transmit state machine 240 is activated and jumps to states 0 to 7. The output clear_to_send signal -SCC_CTS 241 of pin N_CTS, and the output select signal 242 of pin SEL_SCC are disactivated. The disactivation of the select signal modifies the internal connection of 3-input multiplexer 300: the network_data lead NTW_TD which was connected to the data output Q(8), of 62-bit shift register 170 is now reconnected to the data output OUT of transmit state machine 240. The ending_flag of the frame is then transmitted by transmit state machine 240.

Step 4: The ending_flag of the frame is detected by comparator 180, shown in FIG. 3B. The output of comparator 180 is activated on lead (181) during one clock period.

The byte following the ending_flag being the idle pattern, comparator 190 detects it and its output is activated on lead 191. The AND gate 220 is disabled through inverter 210 and no pulse is generated to the strobe inputs of both 54-bit and 6-bit registers 260, 270. The content of these registers remains unchanged.

Figure 6:
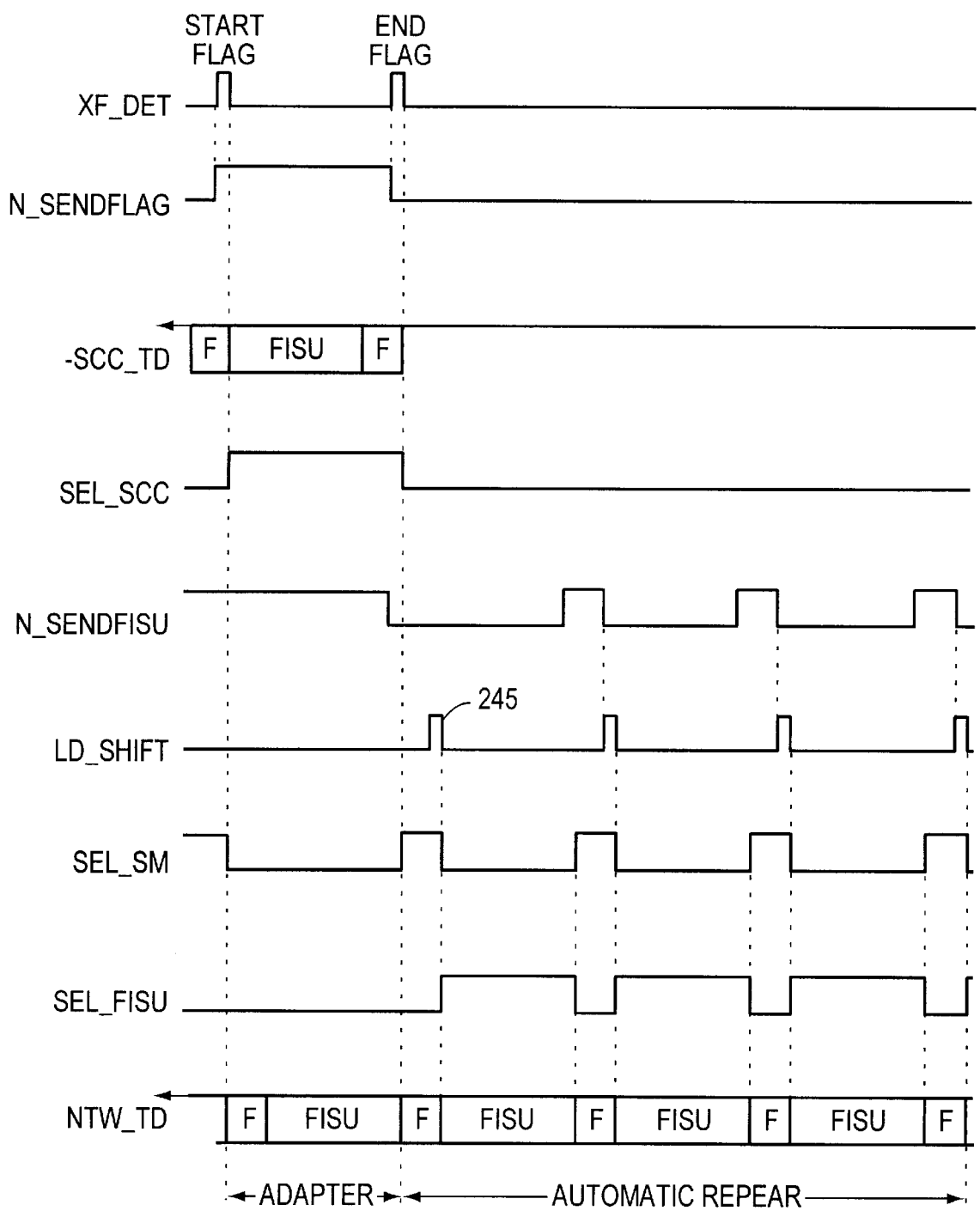
FIG. 6 is timing diagram of the automatic transmission of FISU frames to the network of FIG. 2.

Step 5: The repeated transmission of FISU frames is described in association with the timing diagrams shown in FIG. 6. During the transmission of the flag, in state 7, a pulse 245 is generated on the load_shift output pin LD_SHIFT. On the rising edge of this pulse the contents of 54-bit register 260, shown in FIG. 3B is stored into 54-bit shift register 280 through the parallel port input. When the flag is transmitted, transmit state machine 240 detects the activation of its input N_SENDFISU and jumps to state 17 where the select output SEL_FISU, is activated. This activation modifies the internal connection of 3-input multiplexer 300, shown in FIG. 3C: the network_data output NTW_TD which received the data output signal X(8) of 62-bit shift register 170 receives now the data output signal Q(54) of 54-bit shift register 280, shown in FIG. 3B.

In addition, the activation of the select signal SEL_FISU enables the transmit_clock SCC_TCLK to clock the 54-bit shift register 280. Therefore, the FISU frame stored into the shift register is transmitted onto the network.

The last byte Q(47 . . . 54) of 54-bit shift register 280 is checked by comparator 310, shown in FIG. 3C. When a flag is detected, the output of comparator 310 is activated and the input pin N_SENDFISU of transmit state machine 240 is disactivated through OR gate 330. Then the transmit state machine 240 jumps to states 0 to 7 where it transmits the flag.

The pulse generated in state 7 re-loads 54-bit shift register 280 with the FISU frame stored into 54-bit register 260. The last byte Q(47 . . . 54) is now loaded with the data byte BSN and the output comparator 310 is disactivated. Thus, the input N_SENDFISU of transmit state machine 240 is re-activated through OR gate 330 and transmit state machine 240 jumps to state 17 to transmit another consecutive FISU frame.

This process takes place until the SS7 adapter wants to transmit a new frame by activating the request_to_send signal -SCC_RTS 121, shown in FIG. 3C.

Figure 7:
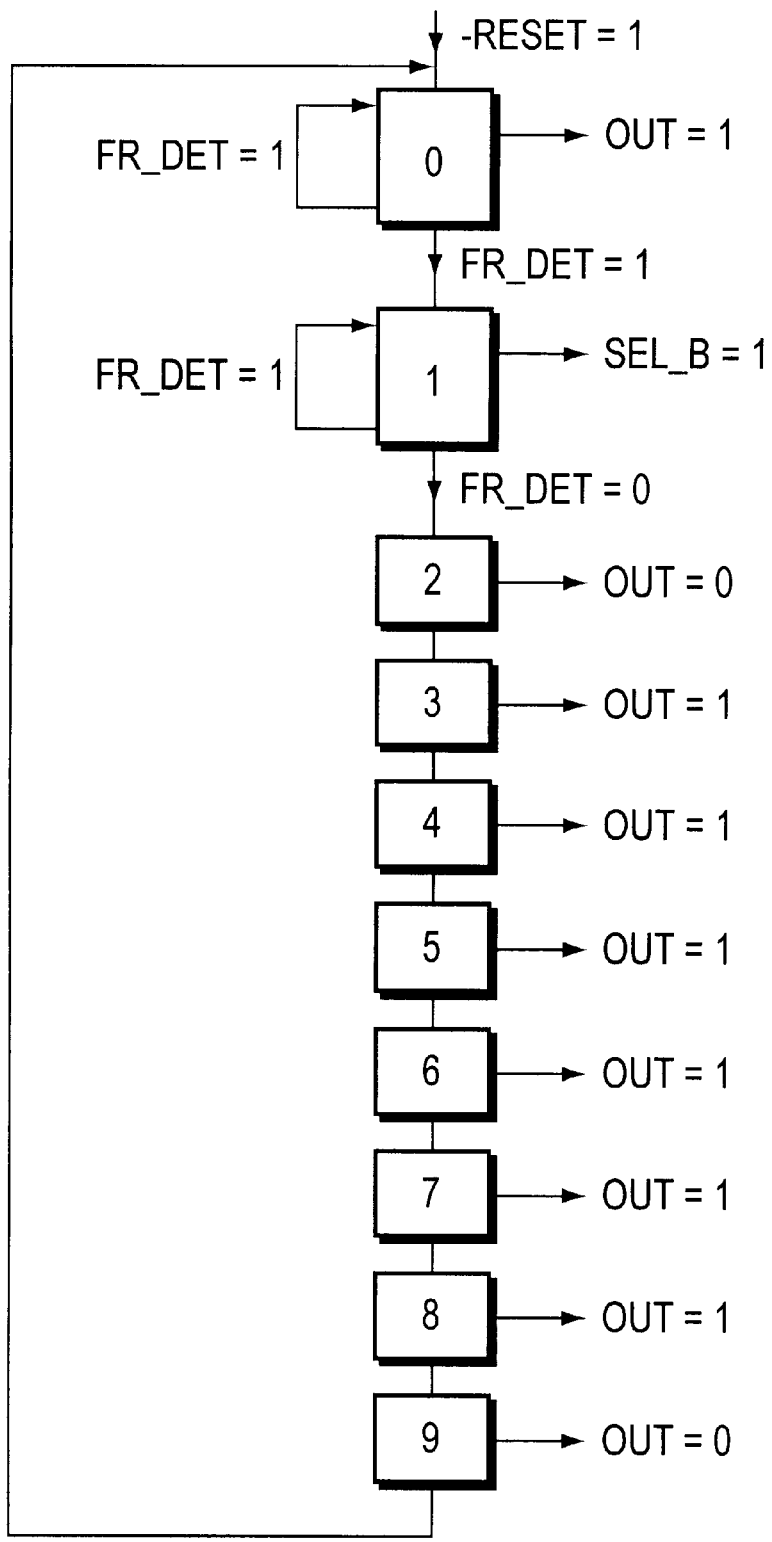
FIG. 7 is a representation of the different states of a receive state machine.

* FISU Frame Reception Description:

The network provides the card with the receive_clock signal 401 SCC_RCLK through V.35 balanced receiver 400, shown in FIG. 3C, so as to generate the signal to the SS7 adapter through V.35 balanced driver 150. When the card switches from the reset mode to the operational mode, the receive state machine 690, shown in FIG. 3D, starts to operate and will be described in conjunction with FIG. 7.

State 0 is a wait state when no received frame has to be reported to the SS7 adapter. The data output OUT is generating the 'idle off' pattern. State 1 is a wait state corresponding to the case when a received frame is transmitted to the SS7 adapter. The select output SEL_B 691 is activated. States 2 to 9 generate a flag on the data output OUT. This flag represents the ending_flag of the frame transmitted to the SS7 adapter as described later.

Starting from reset mode, receive state machine 690 loops to state 0 where the data output OUT is generating the 'idle off' pattern. Since the select output SEL_B is not activated, the network_data output NTW_RD 701 of 2-input multiplexer 700 is internally connected to the data output OUT of receive state machine 690. Therefore, the SS7 adapter receives the 'idle off' pattern through V.35 balanced driver 160.

The receive state machine 690 operates on the rising edge of receive clock signal SCC_RCLK 401. Before the transmission to the SS7 adapter, the data are shifted on the falling edge of receive clock signal by latch 720, shown in FIG. 3D, which receives the inverted receive clock 401 signal through inverter 710. The output signal 721 of latch 720 is further referred as -SCC_RD.

Figure 3F:
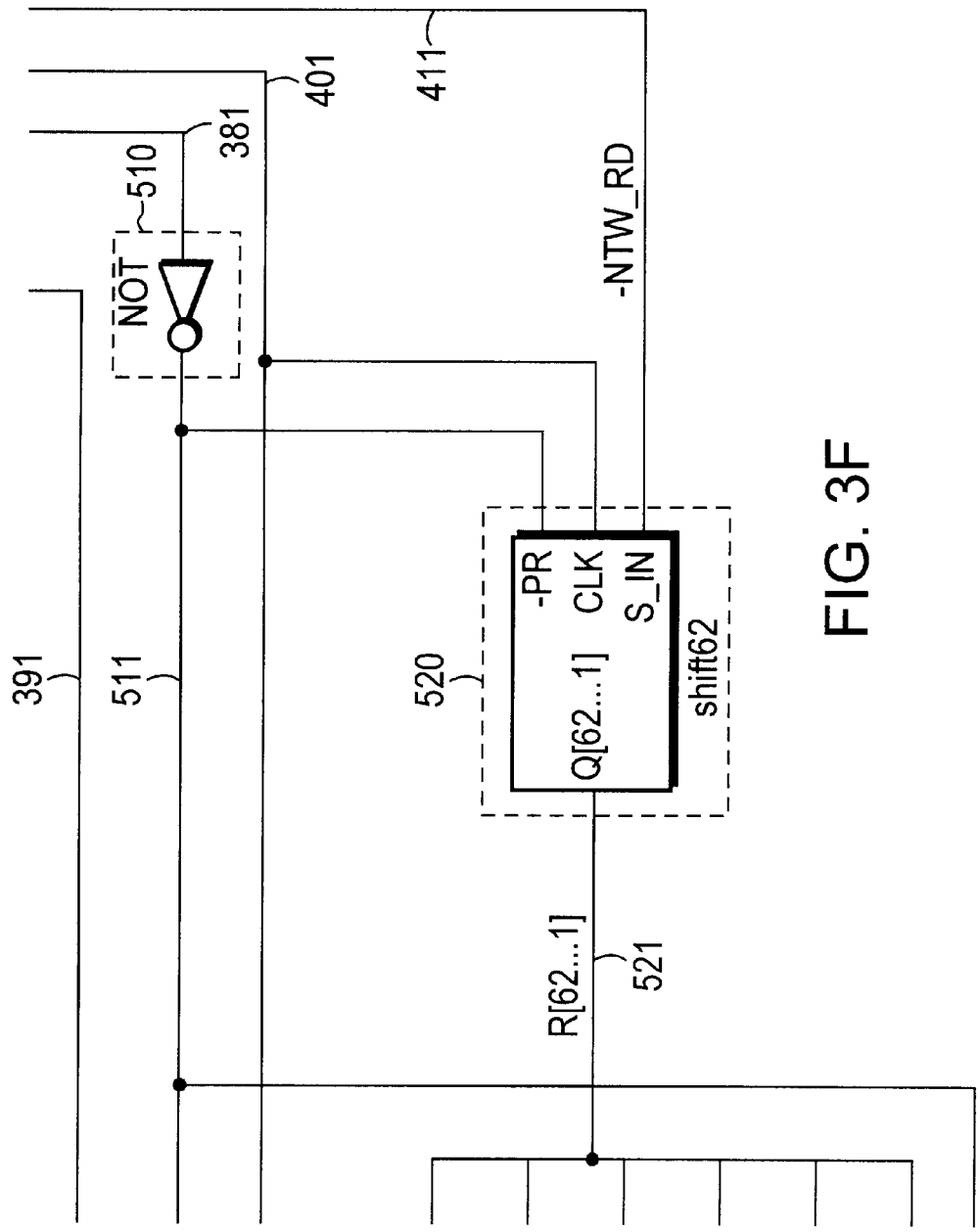

When the network provides a SS7 frame through V.35 balanced receiver 410, shown in FIG. 3C, the signal -NTW_RD 411, the frame is progressing into 62-bit shift register 520, shown in FIG. 3F, from bit 1 to 62 for analysis. Along with the 62-bit shift register 520, three detection fields are implemented: the contents of bits 1–8, bits 47–54 and bits 55–62 are analyzed respectively by comparators 550, 540, 530, shown in FIG. 3E, which check a flag pattern (7EH value).

Figure 8:
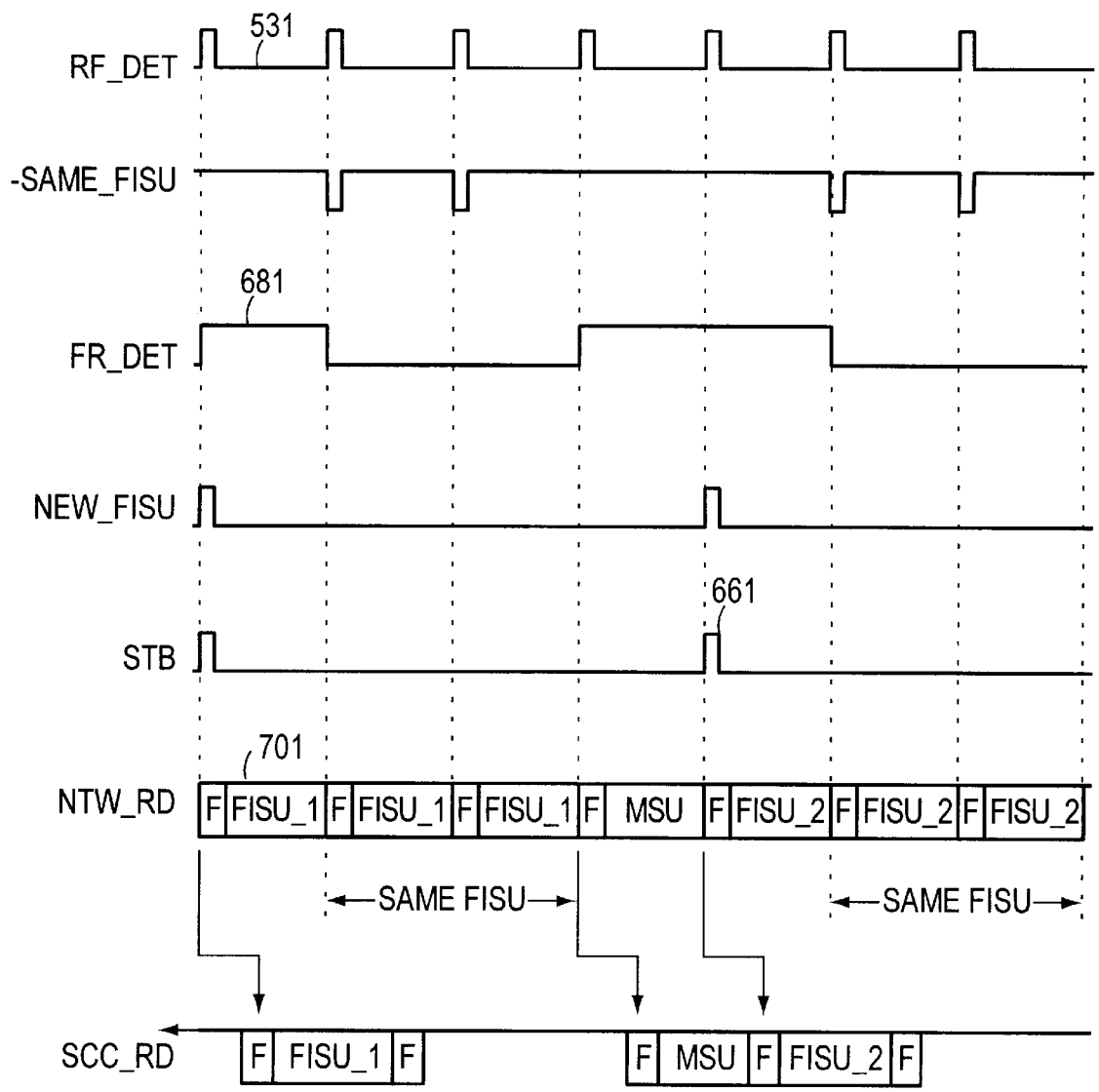
FIG. 8 is a timing diagram of the automatic cancellation of FISU frames received from the network of FIG. 2.

The reception of a frame is described in association with the timing diagrams shown in FIG. 8.

Step 1: The starting_flag of frame (n) is detected by comparator 550 and its output is activated during one clock period. This pulse clears the contents of counter 570. Then, along with the progression of the starting_flag in 62-bit shift register 520, counter 570 is incremented.

Step 2: The received frame is analyzed when the starting_flag of the frame is detected by comparator 530. The value of counter 570 determines the frame as follows:

If an MSU frame is received, the counter is greater that 6 and the MSU frame is transmitted to the SS7 adapter as described below in step 3;

If an LSSU frame is received, the counter is greater than 6 and the LSSU frame is transmitted to the SS7 adapter as described in step 3;

If a FISU frame is received, the counter is lower or equal to 6, the entire frame is stored into 62-bit shift register 520 and the ending_flag is detected by comparator 550 which clears the counter. Depending on the number of 0-bit inserted, the value of the counter is between 0 and 6.

When a FISU frame is detected, a control_logic hardware checks if this FISU frame carries any information within BSN and FSN data bytes. This is done by comparing the received pair BSN/FSN with the last received pair BSN/FSN:

If these two pairs are not identical, then the FISU frame is transmitted to the SS7 adapter as described in step 3;

Otherwise, the FISU frame is not transmitted to the SS7 adapter.

The control_logic hardware is made of a 19-bit register 560, a 19-bit comparator 590, a 6-bit comparator 580, inverters 600 and 610, a NAND gate 630 and AND gates 620 and 660.

When the value of counter 570 is lower than 7, the output of comparator 580 is disactivated and therefore NAND gate 630 and AND gate 620 receive on one of their inputs an activated signal through inverter 600. This activated signal indicates the detection of a FISU frame. The last BSN/FSN data bytes received are stored in 19-bit register 560 controlled by the strobe input signal STB 661, shown in FIG. 3. This register is 19-bit width instead of 16-bit because of the 0-bit insertion algorithm. The 19-bit comparator 590 compares the output bus R(36 . . . 54) of 62-bit shift register 520 which corresponds to the received BSN/FSN bytes, with the contents of 19-bit register 560, shown in FIG. 3E, which holds the last received BSN/FSN bytes:

If they are equal, NAND gate 630 receives an activated signal and its output signal -SAME_RFISU 631 is activated. This signal is used in step 3 in order not to transmit the FISU frame to the SS7 adapter;

Otherwise, AND gate 620 receives an activated signal through inverter 610 and its output signal NEW__RFISU 621 is activated. This signal is used in step 3 to transmit the FISU frame to the SS7 adapter.

When signal NEW__RFISU 621 is activated, AND gate 660 enables a half__clock width pulse 661. On the rising edge of this pulse, the new BSN/FSN data bytes are stored in 19-bit register 560. In addition, the activated signal NEW__RFISU prevents the frame__detection signal 681 from being reset through OR gate 670.

Step 3: The starting__flag of frame (n) is detected by comparator 530. When the starting__flag of frame (n) is detected by comparator 530, its receive flag detect signal RF__DET 531 is activated during one clock period. The rising edge of this pulse activates the output signal 681 of latch 680 if the clear input is not activated. Three modes of operation prevent this setting by activating the clear input of latch 680: reset mode, consecutive flag detection which means that signal -RFLAGS 641 is activated and identical FISU detection which means that signal -SAME__FISU 631 is activated.

The signal -RFLAGS is activated when a flag follows the ending flag of a frame, that's the case during the "power-on" alignment procedure defined by the SS7 protocol. Receive state machine 690, shown in FIG. 3D, detects the activation of its frame__detect input 681 on pin FR__DET, and jumps to state 1 where the select output pin SEL__B is activated. This activation modifies the internal connection of 2-input multiplexer 700 and its network__data output 701 NTW__RD, which was connected to the data output OUT of receive state machine 690, is now connected to the data output Q(62) of 62-bit shift register 520, shown in FIG. 3F. Therefore, the SS7 adapter receives the frame from the network.

Step 4: The ending__flag of frame (n) is detected by comparator 550, shown in FIG. 3E. The output of comparator 550 is activated during one clock period. This pulse clears the contents of counter 570. Then, along with the progression of the ending__flag of this frame (n) in 62-bit shift register 520, counter 570 is incremented to analyze the next frame (n+1).

Step 5: When the ending__flag of frame (n) is detected by comparator 530, its receive flag detect output signal 531 RF__DET shown in FIG. 8, is activated during one clock period. The analysis of the frame (n+1) determines the action to be made:

If the following frame (n+1) is different from the current frame (n), the clear input CLRN of latch 680 shown in FIG. 3E remains disactivated and the frame__detect signal 681 remains set up. Receive state machine 690 shown in FIG. 3D remains in state 1, the output of 2-input multiplexer 700 remains connected to the data output Q(62) of 62-bit shift register 520 shown in FIG. 3F and the SS7 adapter receives the next frame (n+1);

If the following frame (n+1) is the same as the current frame (n), which means that consecutive identical FISU frames are received, the clear input CLRN of latch 680 shown in FIG. 3E is activated by signal -SAME__FISU, shown in FIG. 8, and therefore, the frame__detect signal 681 is reset. Receive state machine 690, shown in FIG. 3D, jumps to state 2 where the select output SEL__B is disactivated. This disactivation modifies the internal connection of 2-input multiplexer 700: its network__data output NTW__RD is reconnected to the data output OUT of receive state machine 690.

The ending__flag of frame (n) is transmitted to the SS7 adapter by the receive state machine 690 during states 2–9 followed by the 'idle off' pattern in state 0.

What is claimed is:

1. A method for processing FISU frames carrying no data according to the signalling system number 7 protocol SS7, used in a data processing system having a processor for transmitting/receiving data and FISU frames between an adapter and a network, said method comprising the steps of:

(a) receiving, in transmission mode, FISU frames from said adapter and repeating said FISU frames when no data are received from the adapter to transmit them to said network without interrupting the processor of the system; and (b) receiving, in reception mode, FISU frames from said network and discarding repeated FISU frames by transmitting idle state signals to the adapter without interrupting a processor included in the adapter.

2. The method of claim 1 wherein in transmission mode, step (a) further comprising the steps of:

storing and analyzing frames received from the adapter in connection with a first analyzing means so as to determine whether the frame is a data frame, a FISU frame or a flag;

responsive to said analyzing step, transmitting flags, data frames received from the adapter or generating repetitive FISU frames to the network; and multiplexing frames received from the adapter to transmit them to he network.

3. The method of claim 1 wherein in reception mode step (b) further comprises the steps of:

storing and analyzing frames received from the network in connection with a second analyzing means so as to determine whether the frame is a data frame or FISU frame;

responsive to said analyzing step, transmitting data frames or analyzing consecutive FISU frames in order to convert repeated FISU frames into idle state signals; and multiplexing data frames, FISU frames and idle state signals to transmit them to the adapter.

4. An apparatus for processing FISU frames carrying no data according to the signalling system number 7 protocol (SS7) and used in a data processing system having a processor for transmitting and receiving data frames and FISU frames between an adapter and a network, said apparatus comprising:

first means for receiving said FISU frames from said adapter and repeating FISU frames to transmit them to said network without interrupting a processor in the adapter; and second means for receiving said FISU frames from said network and discarding repeated FISU frames without interrupting the processor of the system.

5. The apparatus of claim 4 characterized in that said first means further comprises:

means for generating flags, repeated FISU frames and data frames received from the adapter to the network;

first multiplexing means for transmitting flags, repeated FISU frames or data frames received from the adapter to the network; and a first logic circuit for controlling said first generating means and said first multiplexing means.

6. The apparatus of claim 5 wherein said first generating means further comprises:

first storing means for storing frames received from the adapter;

first analyzing means for storing and analyzing frames received from the adapter to detect the types of frames so as determine which bytes are to be transmitted to the network; and means for repeating FISU frames when no data are received from the adapter.

7. The apparatus of claim 6 wherein said first analyzing means is associated with first counting means for determining types of frame received from the adapter and providing value for storage in a register.

8. The apparatus of claim 4 wherein said second means further comprises:

second generating means for discarding repeated FISU frames and data frames received from the network to the adapter;

second multiplexing means for transmitting idle state signals or data frames received from the network; and a second logic circuit for controlling said second generating means and said second multiplexing means.

9. The apparatus of claim 8 wherein said second generating means comprises:

second storing means for storing frames received from the network;

second analyzing means to detect a FISU frame or a data frame so as to determine which bytes are to be transmitted to the adapter; and converting means for generating idle state signals in case of repetitive FISU frames.

10. The apparatus of claim 9 wherein said second analyzing means comprises:

second counting means for determining the type of frame received from the network; and means for comparing consecutive FISU frames so as to determine if they are identical in order to transmit a signal to said converting means which discards repeated FISU frames.

\* \* \* \* \*